United States Patent
Henry et al.

(10) Patent No.: US 10,819,178 B2
(45) Date of Patent: Oct. 27, 2020

(54) STATOR ASSEMBLY INCLUDING INSULATION MEMBER AND METHOD OF ASSEMBLY THEREOF

(71) Applicant: Regal Beloit America, Inc., Beloit, WI (US)

(72) Inventors: Joseph Aaron Henry, Dayton, OH (US); Shirish Vatkar, Tipp City, OH (US); Alan Jacob Manz, Paulding, OH (US); Don James Bray, Sparta, MO (US); Steven Wilfred Post, Cassville, MO (US); Paul Nathanael Selking, Ossian, IN (US)

(73) Assignee: REGAL BELOIT AMERICA, INC., Beloit, WI (US)

(*) Notice: Subject to any disclaimer, the term of this patent is extended or adjusted under 35 U.S.C. 154(b) by 709 days.

(21) Appl. No.: 15/408,088

(22) Filed: Jan. 17, 2017

(65) Prior Publication Data

US 2018/0205280 A1  Jul. 19, 2018

(51) Int. Cl.
| | |
|---|---|
| *H02K 3/34* | (2006.01) |
| *H02K 3/18* | (2006.01) |
| *H02K 15/10* | (2006.01) |
| *H02K 3/52* | (2006.01) |

(52) U.S. Cl.
CPC .............. *H02K 3/345* (2013.01); *H02K 3/18* (2013.01); *H02K 3/522* (2013.01); *H02K 15/10* (2013.01)

(58) Field of Classification Search
CPC .......... H02K 3/345; H02K 3/34; H02K 3/487; H02K 3/18; H02K 3/522; H02K 3/52; H02K 15/10; H02K 2203/12

USPC ................................................. 310/215, 214
See application file for complete search history.

(56) References Cited

U.S. PATENT DOCUMENTS

| | | | |
|---|---|---|---|
| 3,675,056 A | 7/1972 | Lenz | |
| 5,068,563 A * | 11/1991 | Cummings | H02K 3/345 310/194 |
| 5,801,473 A | 9/1998 | Helwig | |
| 6,346,759 B1 | 2/2002 | Suzuki et al. | |
| 2004/0000164 A1 | 1/2004 | Stach et al. | |
| 2004/0164641 A1 | 8/2004 | Yamada et al. | |

(Continued)

FOREIGN PATENT DOCUMENTS

| | | |
|---|---|---|
| EP | 1921731 A2 | 5/2008 |
| JP | 11122855 A * | 4/1999 |

(Continued)

OTHER PUBLICATIONS

Endo (JP 2011135640 A) English Translation (Year: 2011).*
Ishihara (JP 11122855 A) English Translation (Year: 1999).*

*Primary Examiner* — Tulsidas C Patel
*Assistant Examiner* — Robert E Mates
(74) *Attorney, Agent, or Firm* — Armstrong Teasdale LLP

(57) ABSTRACT

An insulation member for a stator assembly includes a first portion configured to couple to a first stator tooth and a second portion movably coupled to the first portion. The insulation member has a first configuration and a second configuration. The second portion is configured to move relative to the first portion when the insulation member moves between the first configuration and the second configuration. The second portion is configured to extend adjacent a second stator tooth when the first portion is coupled to the first stator tooth and the insulation member is in the second configuration.

17 Claims, 5 Drawing Sheets

(56) References Cited

U.S. PATENT DOCUMENTS

| | | |
|---|---|---|
| 2005/0000073 A1 | 1/2005 | Ploeger et al. |
| 2011/0221297 A1* | 9/2011 | Langford ............... H02K 1/146 |
| | | 310/215 |
| 2012/0126653 A1 | 5/2012 | Yang et al. |

FOREIGN PATENT DOCUMENTS

| | | | |
|---|---|---|---|
| JP | 2011135640 A | * | 7/2011 |
| WO | 2010034082 A1 | | 4/2010 |

* cited by examiner

STATOR ASSEMBLY INCLUDING INSULATION MEMBER AND METHOD OF ASSEMBLY THEREOF

BACKGROUND

The field of the disclosure relates generally to electric motors, and more specifically, to electric motors that include a stator assembly and insulation members to insulate components of the stator assembly from electric current flowing through conduction coils.

At least some known electric motors include a stator assembly having a plurality of teeth and conduction coils wrapped around the teeth. In at least some known stator assemblies, the conduction coils are supported by bobbins positioned on the teeth. Electric current is provided to the conduction coils to generate an alternating magnetic flux that causes a rotor of the motor to rotate. In at least some known motors, the stator assembly includes insulation for the conduction coils. However, the insulation is difficult to secure to components of the stator assembly such as the teeth. Accordingly, the insulation increases the cost to assemble the electric motors. In addition, at least some known insulation is incompatible with processes for automatically winding the conduction coils about the bobbins and/or teeth.

BRIEF DESCRIPTION

In one aspect, an insulation member for a stator assembly is provided. The stator assembly includes a first stator tooth and a second stator tooth. The insulation member includes a first portion configured to couple to the first stator tooth and a second portion movably coupled to the first portion. The insulation member has a first configuration and a second configuration. The second portion is configured to move relative to the first portion when the insulation member moves between the first configuration and the second configuration. The second portion is configured to extend adjacent the second stator tooth when the first portion is coupled to the first stator tooth and the insulation member is in the second configuration.

In another aspect, a stator assembly for an electric motor assembly is provided. The stator assembly includes an annular body extending about a central axis. The stator assembly also includes a plurality of stator teeth extending axially from the annular body and spaced circumferentially about the annular body. The plurality of stator teeth include a first stator tooth and a second stator tooth. The first stator tooth and the second stator tooth define a slot therebetween. The stator assembly further includes at least one conduction coil and at least one bobbin to support the at least one conduction coil. The at least one bobbin is coupled to the first stator tooth such that the at least one conduction coil extends about the first stator tooth. The stator assembly also includes at least one insulation member configured to couple to the first stator tooth and extend into the slot. The at least one insulation member has a first configuration and a second configuration. The at least one insulation member extends between the second stator tooth and the at least one conduction coil when the at least one insulation member is in the second configuration and the first portion is coupled to the first stator tooth.

In yet another aspect, a method of assembling a stator assembly for an electric motor assembly is provided. The method includes coupling at least one insulation member to a first stator tooth. The insulation member includes a first portion defining a first surface and a second portion defining a second surface. The first portion includes an opening to receive the first stator tooth. The at least one insulation member has a first configuration and a second configuration. The method also includes moving the second portion relative to the first portion to adjust the at least one insulation member between the first configuration and the second configuration. The first surface and the second surface are substantially planar when the at least one insulation member is in the first configuration. The second surface extends at an angle relative to the first surface when the at least one insulation member is in the second configuration.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
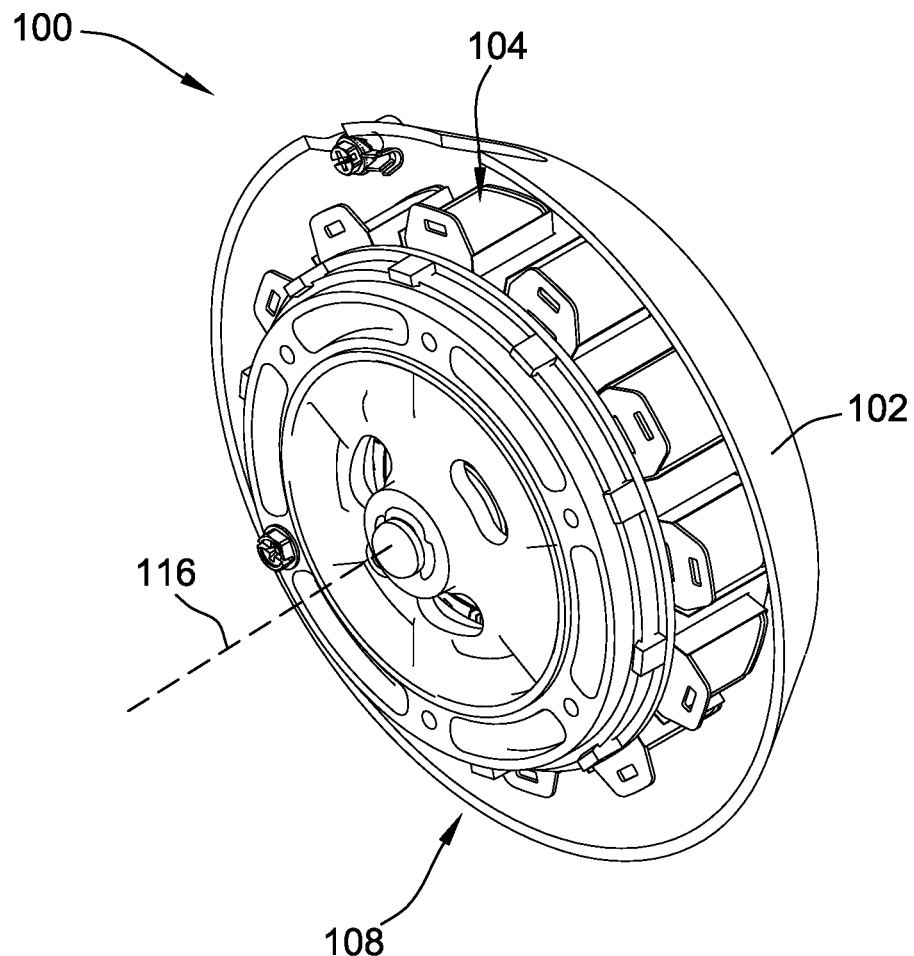
FIG. 1 is a perspective view of an exemplary electric motor assembly.
Figure 2:
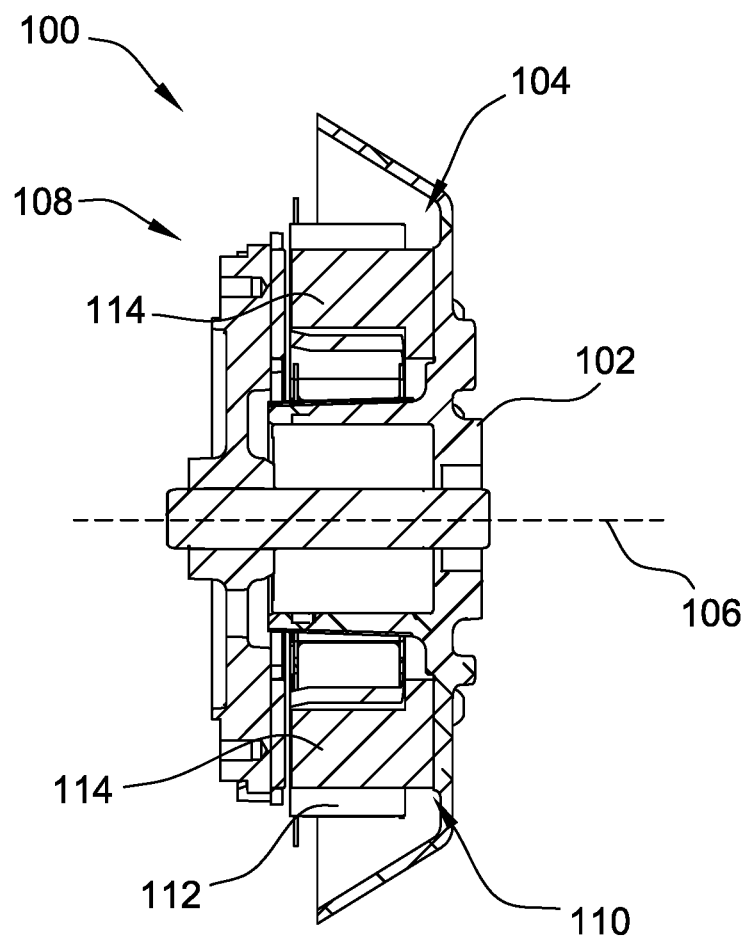
FIG. 2 is a cross-sectional view of the electric motor assembly shown in FIG. 1.

FIG. 1 is a perspective view an exemplary electric motor assembly 100. FIG. 2 is a cross-sectional view of electric motor assembly 100. In the exemplary embodiment, motor assembly 100 includes a motor housing 102, a stator assembly 104, and a rotor assembly 108. Stator assembly 104 includes a magnetic stator core 110 and a plurality of conduction coils 112. Each conduction coil 112 is coupled to one of a plurality of stator teeth 114. In some embodiments, motor assembly 100 includes one conduction coil 112 per stator tooth 114. In the exemplary embodiment, one conduction coil 112 is positioned on every other stator tooth 114. In operation, rotor assembly 108 is positioned adjacent stator assembly 104 and a voltage is applied to conduction coils 112 in sequence to cause rotation of rotor assembly 108. In alternative embodiments, electric motor assembly 100 has any configuration that enables electric motor assembly 100 to operate as described herein.

Figure 3:
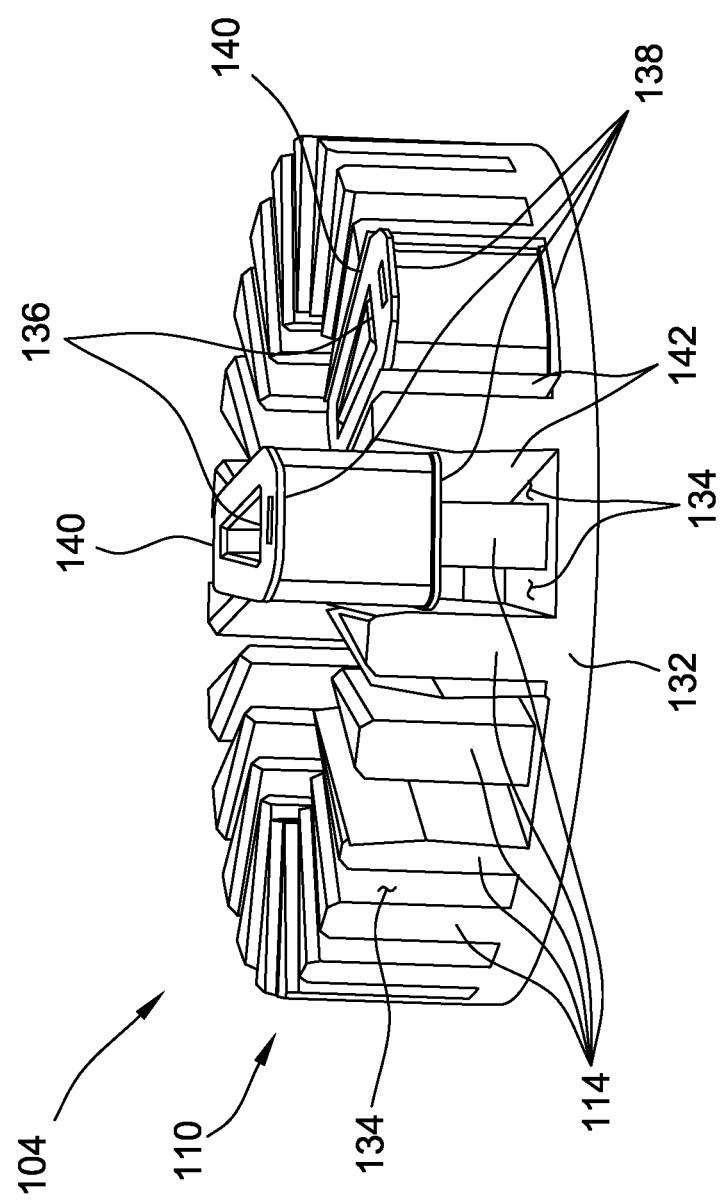
FIG. 3 is a perspective view of a stator assembly of the electric motor assembly shown in FIG. 1.

FIG. 3 is a perspective view of stator assembly 104 of electric motor assembly 100. Stator assembly 104 includes an annular body or backplane 132 extending about axis 116. Stator teeth 114 extend axially from annular body 132. Stator teeth 114 are spaced circumferentially about annular body 132 and define slots 134 therebetween. Slots 134 are configured to receive conduction coils 112. Each conduction coil 112 is positioned on a former or bobbin 136 that is configured to support conduction coil 112. Specifically, each conduction coil 112 is wrapped around bobbin 136 between flanges 138 extending from ends of bobbin 136. Each bobbin 136 includes an opening 140 to receive one stator tooth 114. Bobbins 136 are coupled to every other stator tooth 114 of stator assembly 104 such that conduction coil 112 extends about stator tooth 114 and through slots 134. In particular, each conduction coil 112 extends through slots 134 on each side of the respective stator tooth 114. In the exemplary embodiment, bobbins 136 and conduction coils 112 are positioned on every other stator tooth 114.

In addition, stator assembly 104 includes a plurality of insulation members 142 to insulate components of stator assembly 104, such as annular body 132 and stator teeth 114, from electric current flowing through conduction coil 112. Insulation members 142 are made from a material that is substantially nonconductive. For example, in some embodiments, insulation members 142 are plastic and/or any other material suitable for use as a nonconductive barrier. In alternative embodiments, stator assembly 104 includes any insulation member 142 that enables stator assembly 104 to operate as described herein.

Also, in the exemplary embodiment, insulation members 142 extend into slots 134 between conduction coils 112 and stator teeth 114. More specifically, each conduction coil 112 and insulation member 142 is coupled to a first stator tooth 114 such that insulation member 142 extends between conduction coil 112 and adjacent stator teeth 114. Accordingly, insulation members 142 insulate stator teeth 114 from electric current flowing through conduction coil 112. In the exemplary embodiment, insulation member 142 is separate from bobbin 136 and is coupled to stator tooth 114 prior to coupling bobbins 136 and conduction coils 112 to stator tooth 114. Insulation member 142 is secured between annular body 132 and bobbin 136 when bobbin 136 is coupled to stator tooth 114. In alternative embodiments, insulation member 142 is coupled to stator tooth 114 in any manner that enables stator assembly 104 to operate as described herein.

Also, in the exemplary embodiment, insulation member 142 simplifies assembly of stator assembly 104. For example, insulation member 142 facilitates automatic winding of conduction coils 112. In addition, insulation member 142 is installed without the use of tools. Moreover, insulation member 142 is modular and compatible with different stator assemblies 104.

Figure 4:
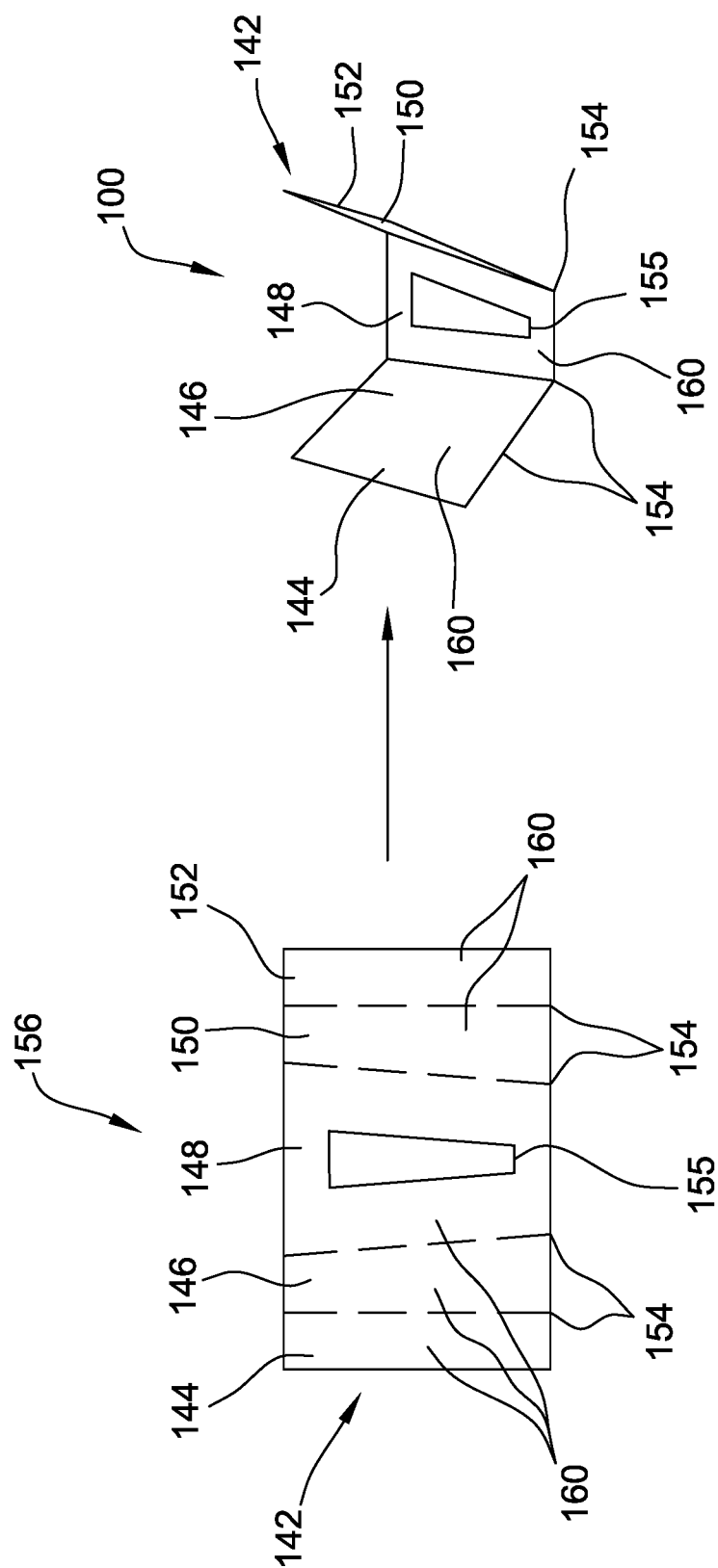
FIG. 4 is a schematic view of an insulation member of the stator assembly shown in FIG. 3.

FIG. 4 is a schematic view of insulation member 142 of stator assembly 104. In the exemplary embodiment, each insulation member 142 includes a first portion 144, a second portion 146, a third portion 148, a fourth portion 150, and a fifth portion 152. A plurality of fold lines 154 separate first portion 144, second portion 146, third portion 148, fourth portion 150, and fifth portion 152. Two of the fold lines 154 are each oriented at an acute angle relative to an edge of each insulation member 142. In alternative embodiments, insulation member 142 includes any portion that enables stator assembly 104 (shown in FIG. 3) to operate as described herein.

In the exemplary embodiment, insulation member 142 defines an opening 155 to receive stator tooth 114 (shown in FIG. 3). In particular, opening 155 is defined by third portion 148 of insulation member 142. Opening 155 is sized and shaped such that insulation member 142 tightly fits about stator tooth 114 (shown in FIG. 3) when stator tooth 114 is received in opening 155. In particular, in the exemplary embodiment, opening 155 has a trapezoidal shape similar to stator tooth 114 (shown in FIG. 3). In alternative embodiments, insulation member 142 includes any opening that enables insulation member 142 to function as described herein.

Also, in the exemplary embodiment, insulation member 142 has a first configuration 156 and a second configuration 158. Insulation member 142 switches between first configuration 156 and second configuration 158 to facilitate insulation member 142 coupling to stator tooth 114 (shown in FIG. 3) and insulating conduction coil 112 (shown in FIG. 3). In particular, second configuration 158 allows insulation member 142 to extend along multiple faces of stator assembly 104 (shown in FIG. 3) such that insulation member 142 at least partially surrounds conduction coil 112 (shown in FIG. 3) in slot 134 (shown in FIG. 3). In alternative embodiments, insulation member 142 has any configuration that enables insulation member 142 to operate as described herein.

In addition, in the exemplary embodiment, each of first portion 144, second portion 146, third portion 148, fourth portion 150, and fifth portion 152 define a surface 160. In first configuration 156, surfaces 160 are substantially planar. In second configuration 158, at least one surface 160 is angled relative to at least one other surface 160. In particular, in second configuration 158, surfaces 160 of first portion 144, second portion 146, fourth portion 150, and fifth portion 152 are substantially perpendicular to surface 160 of third portion 148. Accordingly, insulation member 142 is substantially U-shaped in second configuration 158. Second configuration 158 allows insulation member 142 to extend between conduction coil 112 (shown in FIG. 3) and stator teeth 114 (shown in FIG. 3) on either side of stator tooth 114 when insulation member 142 is coupled to stator tooth 114. In addition, in some embodiments, first portion 144, second portion 146, third portion 148, fourth portion 150, and/or fifth portion 152 are positionable at multiple different angles to facilitate insulation member 142 coupling to different stator assemblies 104 (shown in FIG. 3) and conforming to different slots 134 (shown in FIG. 3).

Also, in the exemplary embodiment, first portion 144 extends at an angle relative to second portion 146. Fifth portion 152 extends at an angle relative to fourth portion 150. Accordingly, first portion 144 and fifth portion 152 facilitate insulation member 142 coupling to bobbin 136 (shown in FIG. 3) when insulation member 142 is in the second configuration. For example, the angles of first portion 144 and fifth portion 152 prevent ends of insulation member 142 from catching on bobbin 136 (shown in FIG. 3).

Moreover, in the exemplary embodiment, first portion 144, second portion 146, third portion 148, fourth portion 150, and fifth portion 152 are configured to pivot or fold about fold lines 154. Accordingly, fold lines 154 facilitate insulation member 142 switching between first configuration 156 and second configuration 158. During operation, at least one of first portion 144, second portion 146, third portion 148, fourth portion 150, and fifth portion 152 is pivoted about at least one fold line 154 to switch between first configuration 156 and second configuration 158. In the exemplary embodiment, fold lines 154 adjacent third portion 148 have a depth configured to facilitate insulation member 142 remaining in second configuration 158. For example, fold lines 154 provide a crease in second configuration 158 that inhibits insulation member 142 biasing towards first configuration 156. In alternative embodiments, insulation member 142 is switched between first configuration 156 and second configuration 158 in any manner that enables insulation member 142 to function as described herein. For example, in some embodiments, fold lines 154 are omitted and insulation member 142 is at least partially flexible. In further embodiments, insulation member 142 includes hinges.

In reference to FIGS. 2 and 3, a method of assembling stator assembly 104 includes coupling insulation member 142 to first stator tooth 114. In particular, opening 155 receives stator tooth 114 such that insulation member 142 extends about stator tooth 114. In addition, the method includes adjusting insulation member 142 between first configuration 156 and second configuration 158. In some embodiments, at least one of first portion 144, second portion 146, third portion 148, fourth portion 150, and fifth portion 152 is pivoted about fold line 154 to adjust insulation member 142 between first configuration 156 and second configuration 158. In some embodiments, insulation member 142 automatically moves between first configuration 156 and second configuration 158 when insulation member 142 is coupled to stator tooth 114. For example, in some embodiments, at least one stator tooth 114 contacts insulation member 142 and induces insulation member 142 to move between first configuration 156 and second configuration 158 as insulation member 142 is positioned on stator tooth 114. In further embodiments, insulation member 142 is moved between first configuration 156 and second configuration 158 prior to coupling insulation member 142 to stator tooth 114.

The method also includes coupling conduction coil 112 to bobbin 136 and coupling bobbin 136 to stator tooth 114 such that conduction coil 112 extends about stator tooth 114. In some embodiments, conduction coil 112 is at least partially wound by an automatic winding device. Bobbin 136 and insulation member 142 are configured to facilitate the automatic winding of conduction coil 112. In particular, in some embodiments, conduction coil 112 is wound prior to insulation member 142 coupling to bobbin 136. In further embodiments, conduction coil 112 is wound on bobbin 136 while insulation member 142 is coupled to bobbin 136 in first configuration 156 and insulation member 142 moves to second configuration 158 after conduction coil 112 is at least partially wound.

Figure 5:
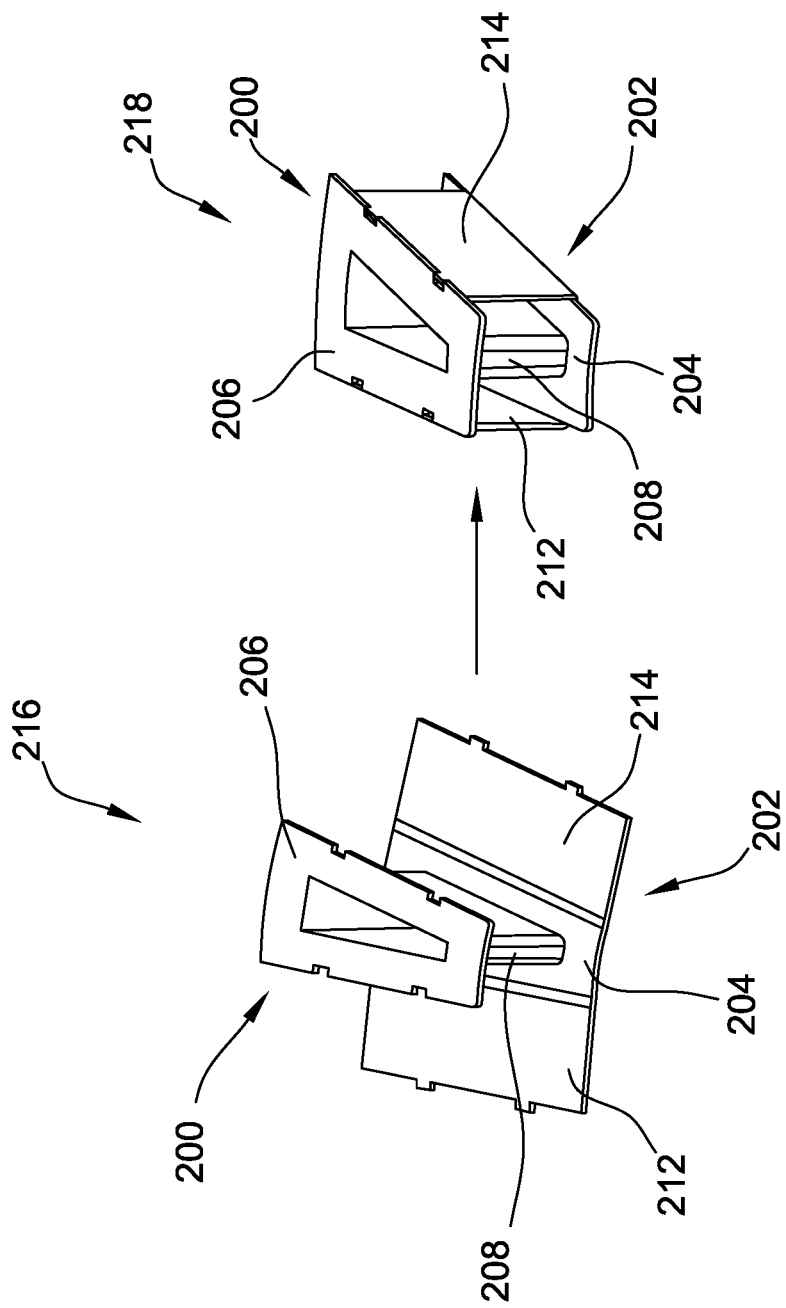
FIG. 5 is schematic view of an alternative embodiment of a bobbin and insulation member for use with the electric motor assembly shown in FIGS. 1 and 2.

FIG. 5 is a schematic view of an alternative embodiment of a bobbin 200 and insulation member 202 for use with electric motor assembly 100. Bobbin 200 includes a first flange 204, a second flange 206, and a body 208 extending between first flange 204 and second flange 206. Body 208 is configured to support conduction coil 112 (shown in FIG. 3) such that conduction coil 112 extends about stator tooth 114 (shown in FIG. 3) when bobbin 200 is coupled to stator tooth 114. In addition, body 208 defines an opening 210 to receive stator tooth 114 (shown in FIG. 1). In alternative embodiments, bobbin 200 has any configuration that enables bobbin 200 to function as described herein.

In the exemplary embodiment, insulation member 202 is integrally formed with bobbin 200. In particular, insulation member 202 extends from an end of bobbin 200. Insulation member 202 includes a first portion 212 and a second portion 214. First portion 212 and second portion 214 extend from opposite sides of first flange 204 and pivot relative to first flange 204. Accordingly, first flange 204 forms a central portion of insulation member 202 and couples first portion 212 and second portion 214. In alternative embodiments, insulation member 202 includes any portion that enables insulation member 202 to function as described herein.

As shown in FIG. 5, insulation member 202 has a first configuration 216 and a second configuration 218. In first configuration 216, second portion 214 and first portion 212 are substantially planar with first flange 204. In second configuration 218, first portion 212 and second portion 214 are angled relative to first flange 204. In addition, first portion 212 and second portion 214 removably couple to second flange 206 in the second configuration. Accordingly, bobbin 200 and insulation member 202 surround conduction coil 112 (shown in FIG. 3) when conduction coil 112 is coupled to bobbin 200 and insulation member 202 is in second configuration 218.

In reference to FIGS. 3 and 5, during operation, conduction coil 112 is wound around bobbin 200. In some embodiments, conduction coil 112 is at least partially wound by an automatic winding device. Bobbin 200 and insulation member 202 facilitate the automatic winding of conduction coil 112. In particular, insulation member 202 allows automatic winding of conduction coil 112 on bobbin 200 when insulation member 202 is in first configuration 216. After conduction coil 112 is wound, bobbin 200 and conduction coil 112 are coupled to stator tooth 114. In particular, stator tooth 114 is received within opening 210 of bobbin 200. When bobbin 200 is coupled to stator tooth 114, insulation member 202 moves between first configuration 216 and second configuration 218. In second configuration 218, insulation member 202 removably couples to second flange 206. In some embodiments, insulation member 202 automatically moves between first configuration 216 and second configuration 218 when bobbin 200 is coupled to stator tooth 114. In further embodiments, insulation member 202 is moved between first configuration 216 and second configuration 218 prior to coupling bobbin 200 to stator tooth 114.

The apparatus, methods, and systems described herein provide an insulation member for a stator assembly of an electric motor. The insulation member is adjustable between a first configuration and a second configuration. The first configuration and the second configuration facilitate the insulation member coupling to a stator tooth and allow use of the insulation member with different stator assemblies. Accordingly, the insulation member is modular and reduces the cost to assemble stator assemblies. In addition, the insulation member facilitates automatic winding of conduction coils of the stator assembly.

Exemplary embodiments of an electric motor assembly are described above in detail. The electric motor assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insulation member for a stator assembly, the stator assembly including a first stator tooth and a second stator tooth, said insulation member comprising:
    a first portion configured to couple to the first stator tooth, said first portion defines an opening configured to receive the first stator tooth, wherein said opening has a trapezoidal shape; and
    a second portion movably coupled to said first portion, said insulation member having a first configuration and a second configuration, said second portion configured to move relative to said first portion when said insulation member moves between the first configuration and the second configuration, wherein said second portion is configured to extend adjacent the second stator tooth when said first portion is coupled to the first stator tooth and said insulation member is in the second configuration, wherein said insulation member defines at least one fold line, said second portion of said insulation member configured to pivot about said at least one fold line when said insulation member moves between the first configuration and the second configuration, wherein said at least one fold line is oriented at an acute angle relative to an edge of said insulation member.

2. The insulation member in accordance with claim 1, wherein said first portion is integrally formed with a bobbin configured to support a conduction coil.

3. The insulation member in accordance with claim 1, wherein said first portion is configured to extend about the first stator tooth and into slots on either side of the first stator tooth when the first stator tooth is received in the opening.

4. The insulation member in accordance with claim 3 further comprising a third portion movably coupled to said first portion, wherein said third portion extends adjacent a third stator tooth when said first portion is coupled to the first stator tooth and said insulation member is in the second configuration.

5. The insulation member in accordance with claim 1, wherein said first portion defines a first surface and said second portion defines a second surface, and wherein said first surface and said second surface are substantially planar when said insulation member is in the first configuration.

6. The insulation member in accordance with claim 5, wherein said second surface extends at an angle relative to said first surface when said insulation member is in the second configuration.

7. The insulation member in accordance with claim 1, wherein said at least one fold line has a depth configured to facilitate said insulation member remaining in the second configuration.

8. The insulation member in accordance with claim 7 further comprising a third portion movably coupled to said second portion, wherein said third portion extends at an angle relative to said second portion to facilitate said insulation member coupling to a bobbin when said insulation member is in the second configuration.

9. A stator assembly for an electric motor assembly, said stator assembly comprising:
    an annular body extending about a central axis;
    a plurality of stator teeth extending axially from said annular body and spaced circumferentially about said annular body, said plurality of stator teeth including a first stator tooth and a second stator tooth, said first stator tooth and said second stator tooth defining a slot therebetween;
    at least one conduction coil;
    at least one bobbin to support said at least one conduction coil, said at least one bobbin coupled to said first stator tooth such that said at least one conduction coil extends about said first stator tooth; and
    at least one insulation member configured to couple to said first stator tooth and extend into said slot, wherein said at least one insulation member has a first configuration and a second configuration, wherein said at least one insulation member extends between said second stator tooth and said at least one conduction coil when said at least one insulation member is in the second configuration and is coupled to the first stator tooth, wherein said at least one insulation member defines an opening to receive said first stator tooth, and wherein said opening has a trapezoidal shape, wherein said at least one insulation member defines at least one fold line, a portion of said at least one insulation member configured to pivot about said at least one fold line when said at least one insulation member switches between the first configuration and the second configuration, wherein said at least one fold line is oriented at an acute angle relative to an edge of said insulation member.

10. The stator assembly in accordance with claim 9, wherein said at least one insulation member is integrally formed with said at least one bobbin.

11. The stator assembly in accordance with claim 10, wherein said at least one bobbin includes a first flange and said at least one insulation member includes a portion coupled to said first flange, said portion configured to move relative to said first flange when said at least one insulation member switches between the first configuration and the second configuration.

12. The stator assembly in accordance with claim 11, wherein said at least one bobbin includes a second flange, said at least one insulation member configured to removably couple to said second flange when said at least one insulation member is in the second configuration.

13. The stator assembly in accordance with claim 9, wherein said at least one insulation member defines a first surface and a second surface, and wherein said first surface and said second surface are substantially planar when said at least one insulation member is in the first configuration.

14. The stator assembly in accordance with claim 13, wherein said second surface extends at an angle relative to said first surface when said at least one insulation member is in the second configuration.

15. The stator assembly in accordance with claim 9, wherein said at least one insulation member is separate from said at least one bobbin.

16. A method of assembling a stator assembly for an electric motor assembly, said method comprising:
    coupling at least one insulation member to a first stator tooth, the insulation member including a first portion defining a first surface and a second portion defining a second surface, the first portion further defining an opening configured to receive the first stator tooth when the at least one insulation member is coupled to the first stator tooth, wherein the at least one insulation member has a first configuration and a second configuration, and wherein the opening has a trapezoidal shape; and
    moving the second portion relative to the first portion to adjust the at least one insulation member between the first configuration and the second configuration by pivoting the second portion of the at least one insulation member about a fold line, wherein the fold line is oriented at an acute angle relative to an edge of the insulation member, wherein the first surface and the second surface are substantially planar when the at least one insulation member is in the first configuration, and wherein the second surface extends at an angle relative to the first surface when the at least one insulation member is in the second configuration.

17. The method in accordance with claim 16 further comprising coupling at least one conduction coil to at least one bobbin and coupling the at least one bobbin to the first stator tooth such that the at least one conduction coil extends about the first stator tooth, wherein the at least one insulation member extends between the at least one conduction coil and a second stator tooth.

\* \* \* \* \*